United States Patent
Albert et al.

(10) Patent No.: US 9,261,369 B2
(45) Date of Patent: Feb. 16, 2016

(54) METHOD AND SYSTEM FOR AUTOMATICALLY MODIFYING A LATERAL FLIGHT PLAN OF AN AIRCRAFT

(71) Applicant: Airbus Operations SAS, Toulouse (FR)

(72) Inventors: Nicolas Albert, La Salvetat Saint Gilles (FR); Boris Kozlow, Toulouse (FR); Maxime Wachenheim, Toulouse (FR)

(73) Assignee: Airbus Operations SAS (FR)

( * ) Notice: Subject to any disclaimer, the term of this patent is extended or adjusted under 35 U.S.C. 154(b) by 119 days.

(21) Appl. No.: 14/250,562

(22) Filed: Apr. 11, 2014

(65) Prior Publication Data

US 2015/0204675 A1    Jul. 23, 2015

(30) Foreign Application Priority Data

Apr. 15, 2013   (FR) ...................................... 13 53404

(51) Int. Cl.
*G06F 19/00* (2011.01)
*G01C 21/20* (2006.01)
*G08G 5/00* (2006.01)

(52) U.S. Cl.
CPC .............. *G01C 21/20* (2013.01); *G08G 5/0039* (2013.01); *G08G 5/0021* (2013.01)

(58) Field of Classification Search
None
See application file for complete search history.

(56) References Cited

U.S. PATENT DOCUMENTS

| | | | |
|---|---|---|---|
| 5,650,703 A | 7/1997 | Yardley et al. | |
| 2006/0015247 A1 | 1/2006 | Speer | |
| 2015/0112583 A1* | 4/2015 | Koebel | G08G 5/0039 701/400 |
| 2015/0204675 A1* | 7/2015 | Albert | G01C 21/20 701/400 |
| 2015/0254989 A1* | 9/2015 | Kozlow | G05D 1/0202 701/466 |

* cited by examiner

*Primary Examiner* — Adam Alharbi
(74) *Attorney, Agent, or Firm* — Lerner, David, Littenberg, Krumholz & Mentlik, LLP

(57) ABSTRACT

A system for automatically modifying a lateral flight plan of an aircraft includes modifying means adapted to modify the flight plan by an action to chosen among the following actions: deleting, adding and moving at least one waypoint of an initial flight plan (T1). The modified flight plan (T3) includes one downstream waypoint (P6) defined as the waypoint on which the aircraft gets back to the initial flight plan (T1), and one upstream waypoint (P4) preceding the downstream waypoint (P6). By defining an intermediate point (P5') between the upstream (P4) and downstream (P6) waypoints, the coordinates are calculated in order to allow the aircraft to reach the downstream waypoint (P6) with the same course as the initial flight plan (T1).

9 Claims, 2 Drawing Sheets

Figure 1:
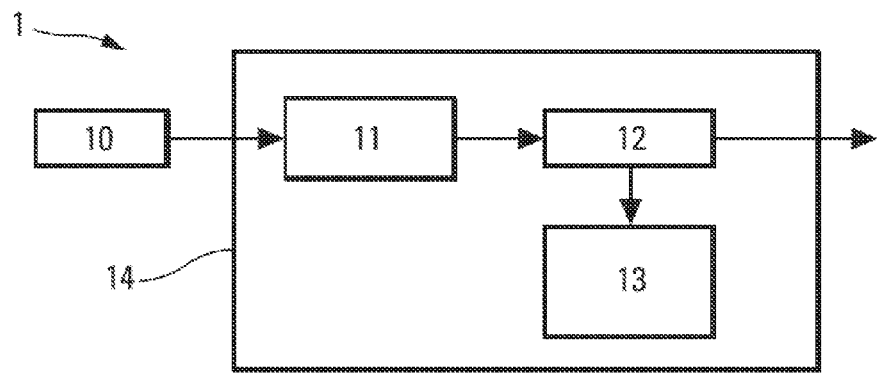

METHOD AND SYSTEM FOR AUTOMATICALLY MODIFYING A LATERAL FLIGHT PLAN OF AN AIRCRAFT

The present invention relates to a method and a device for automatically modifying a lateral flight plan of an aircraft, more particularly in a low-altitude section of flight.

A flight plan is conventionally constructed from a sequence of waypoints that the aircraft flies over successively in a predetermined order. These waypoints are provided to the flight management system, which calculates flight-path portions which connect said waypoints using a flight-path calculator.

In the current systems, a flight-path portion which connects two points is defined such that:
- first, the aircraft flies over a first waypoint, then follows a rectilinear flight path for a predefined distance, while maintaining the same course as that with which it arrived at this first waypoint;
- then, it turns to orient its course towards the next waypoint, the turn being made along an arc of a circle of which the radius is predetermined; and
- when it is correctly oriented, it follows a rectilinear flight path until the next waypoint.

This method for constructing the flight path is repeated for calculating all the flight-path portions between the waypoints of the flight plan. The turning radius is selected for each waypoint which precedes it, and it may depend for example on the performance of the aircraft or on the terrain for a low-altitude flight.

Furthermore, the flight path of an aircraft has a vertical component and a lateral component. In the case of a low-altitude flight, the vertical component depends on many parameters such as the relief of the land over which the aircraft will fly, the speed of the aircraft or its weight.

During the flight, it may be necessary to modify the flight plan, for example if an obstacle appears at low altitude. One or more waypoints may thus be deleted, added or moved to allow the aircraft to return to a later waypoint of the initial flight plan, this occurring directly, by passing a waypoint which has been moved, or by passing additional waypoints. To do this, the aircraft reorients its course towards the downstream waypoint of the initial flight plan from an upstream waypoint which precedes the downstream waypoint. In the case of a deletion, the upstream waypoint is a point on the initial flight plan. In the case of an addition, the upstream waypoint is a waypoint that has been added. In the case of a move, the upstream waypoint is a waypoint that has been moved.

However, the aircraft does not arrive at the downstream waypoint with the same course, in other words the same orientation, as that of the initial flight plan, since it is following another path and it is coming from another waypoint. As a result, by using the method for calculating the normal flight path to obtain the flight path from this downstream waypoint, a different flight-path portion from that of the initial flight plan is obtained. Not only is it different for this portion following said downstream waypoint, but the modification can also have an impact on the flight-path portions of the subsequent points. Therefore, although the waypoints are the same, the flight-path portions connecting said waypoints may not be identical. Consequently, obstacles which were bypassed or avoided owing to the initial flight plan and the initial flight path may appear on the route following this modification. These flight paths have to be checked to ensure the safety of the flight.

The current methods and devices for calculating a flight path therefore do not make it possible to obtain an identical flight path between the waypoints when the aircraft returns to the initial flight plan following a modification.

The present invention relates to a method for automatically modifying a lateral flight plan of an aircraft, the flight plan being defined by a sequence of waypoints that the aircraft is to fly over and flight-path portions connecting the successive waypoints, the object being to remedy this drawback.

According to the invention, said method is distinctive in that, for modifying an initial flight plan to become a modified flight plan, it comprises the steps of:
- performing an action to be selected from the following actions: adding, deleting or moving at least one waypoint of the initial flight plan, said modified flight plan comprising a downstream waypoint defined as the waypoint at which the aircraft returns to the initial flight plan, and an upstream waypoint preceding the downstream waypoint, and
- defining an intermediate point between said upstream and downstream waypoints of which the coordinates are calculated to allow the aircraft to arrive at said downstream waypoint on the same course as that provided by the initial flight plan.

Therefore, owing to the present invention, the modified flight plan is such that the aircraft flies over the downstream waypoint with the same course as that of the initial flight plan. The rest of the flight path from this downstream waypoint onwards is therefore identical to that of the initial flight plan, and this makes it possible to remedy the above-mentioned drawback.

According to different embodiments of the invention, which may be taken in combination or in isolation:
- for defining the intermediate point, said method comprises sub-steps of:
  - defining a first upstream circle having a first predetermined radius, passing through a crossing point of the aircraft located after the upstream waypoint and positioned such that the direction of the aircraft at said crossing point is tangential to said first circle;
  - defining a second downstream circle having a second predetermined radius, passing through said downstream waypoint and positioned such that the flight path corresponding to the initial flight plan of the aircraft at said downstream waypoint is tangential to said second circle;
  - defining a straight line tangential to said first and second circles, said tangential straight line being tangential to the first circle at a first point of intersection and to the second circle at a second point of intersection; and
  - defining said intermediate point on said tangential straight line between said first and second points of intersection;
- said intermediate point is located at a distance from the second point of intersection corresponding to a predetermined straight-line-flight distance between the waypoints;
- said first and second radii of said first and second circles, respectively, are equal. Of course, they may also be different;
- said crossing point is positioned at a distance from the upstream waypoint corresponding to a predetermined straight-line-flight distance between the waypoints;
- the part of the lateral flight path corresponding to the modified flight plan of the aircraft up to the downstream waypoint follows in this order:

a first arc of said first circle, this first arc being defined between the crossing point and the first point of intersection;

the tangential straight line between this first point of intersection and the second point of intersection, passing through said intermediate point; and a second arc of the second circle, this second arc being defined between said second point of intersection and said downstream waypoint;

the flight plan is modified for a low-altitude section of flight.

The invention also relates to a device for modifying a lateral flight plan of an aircraft, the flight plan being defined by a sequence of waypoints that the aircraft is to fly over and flight-path portions connecting the waypoints.

According to the invention, this device is distinctive in that it comprises modification means for modifying the flight plan by an action to be selected from the following actions: deleting, adding and moving at least one waypoint of the initial flight plan, said modified flight plan comprising a downstream waypoint defined as the waypoint at which the aircraft returns to the initial flight plan, and an upstream waypoint preceding the downstream waypoint, and by defining a new intermediate point between said upstream and downstream waypoints of which the coordinates are calculated to allow the aircraft to arrive at said downstream waypoint on the same course as that of the initial flight plan.

According to different embodiments of the invention, which may be taken in combination or in isolation:

the modification means comprise elements for respectively:

defining a first upstream circle having a first predetermined radius, passing through a crossing point of the aircraft located after the upstream waypoint and positioned such that the direction of the aircraft at said crossing point is tangential to said first circle;

defining a second downstream circle having a second predetermined radius, passing through said downstream waypoint and positioned such that the flight path corresponding to the initial flight plan of the aircraft at said downstream waypoint is tangential to said second circle;

defining a straight line tangential to said first and second circles, said tangential straight line being tangential to the first circle at a first point of intersection and to the second circle at a second point of intersection; and defining said intermediate point on said tangential straight line, between said first and second points of intersection;

said device further comprises means for triggering the modification of the flight plan and means for transmitting the modified flight plan.

The invention also relates to a flight management system and/or to an aircraft which comprises a device for modifying a lateral flight plan of an aircraft, as described above.

The appended drawings will give a better understanding of how the invention can be embodied. In these drawings, identical reference numerals denote similar elements.

FIG. 1 is a synoptic diagram of a device for modifying a lateral flight plan of an aircraft, this diagram illustrating the invention.

Figure 2:
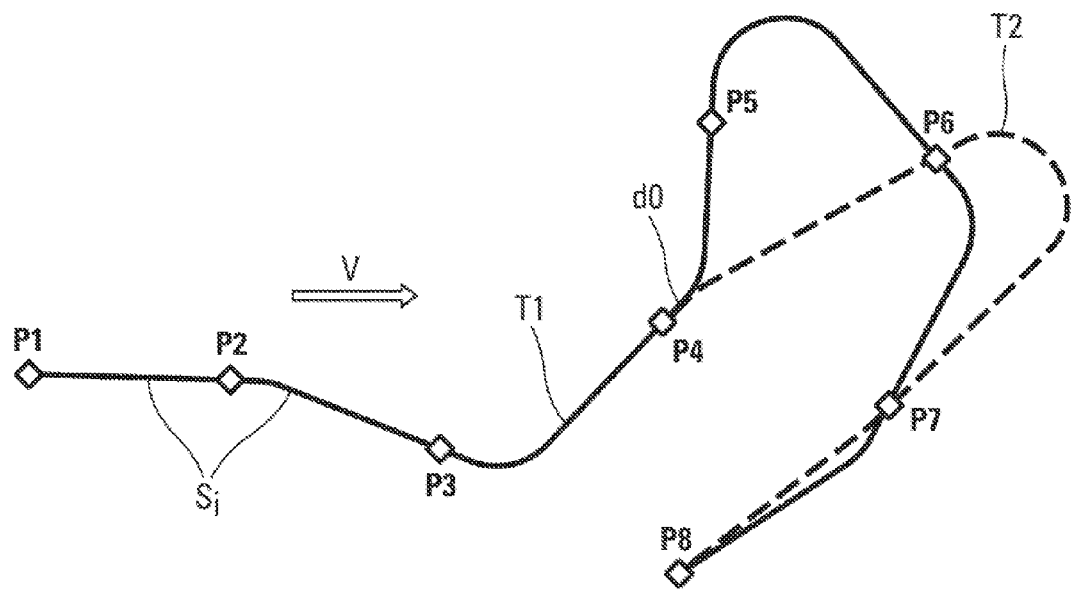

FIG. 2 schematically shows a modified flight plan in which a waypoint has been deleted from the initial flight plan, according to a standard method known in the prior art.

Figure 3:
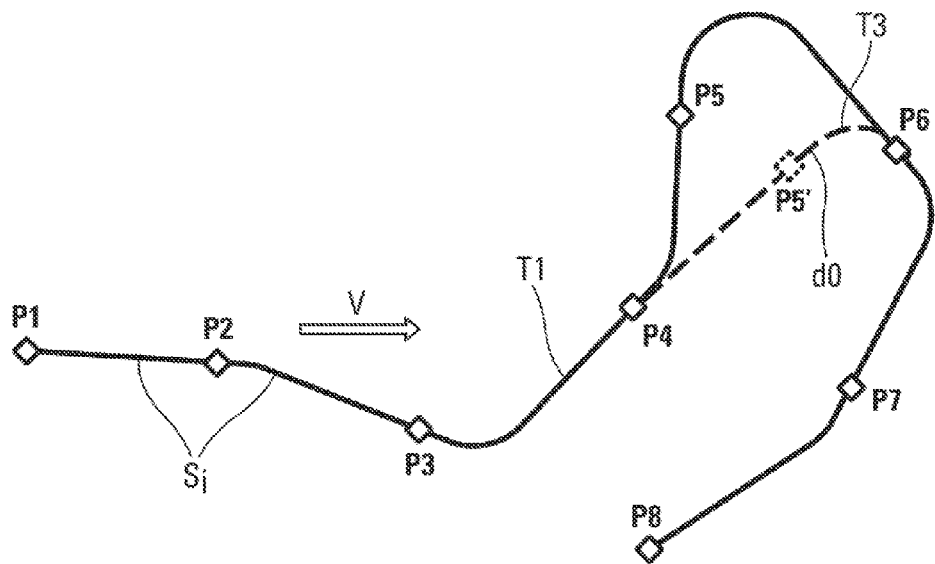

FIG. 3 schematically shows a modified flight plan in which a waypoint has been deleted from the initial flight plan, using a method according to the invention.

Figure 4:
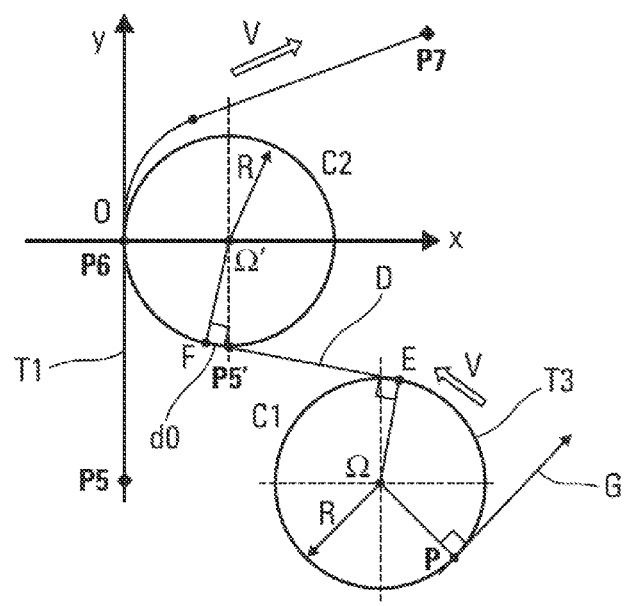

FIG. 4 is a schematic representation showing the method for calculating the intermediate point according to the invention.

FIG. 1 shows a device 1 for modifying a lateral flight plan of an aircraft, this figure illustrating the invention. The device comprises means 11 for modifying the flight plan, means 10 for triggering the modification of the flight plan and means 12 for transmitting the modified flight plan to other systems 13 in the aircraft, such as a navigation system. This device 1 forms at least part of a flight management system 14.

Conventionally, a flight plan T1 is defined by a sequence of waypoints P1 to P8 that the aircraft is to fly over and flight-path portions $S_i$ connecting the successive waypoints, as shown in FIG. 2. In this example, the flight plan T1 relates to a low-altitude section of flight. If necessary, the lateral flight plan T1 may need to be modified to allow the aircraft to avoid an obstacle, in particular by deleting a waypoint and following another route. The embodiment set out in the description relates to a case of deleting a waypoint from the initial flight plan, but the invention is not limited thereto. The method also provides for cases of adding a new waypoint or moving a waypoint which is in the initial flight plan.

The conventional modification methods consist in deleting a waypoint P5 and directly returning to a downstream waypoint P6 of the flight plan, giving the aircraft a flight path T2 shown in FIG. 2. The flight plan includes a series of waypoints numbered P1 to P8 which are connected by flight-path portions $S_i$ provided by a flight-path calculator forming part, for example, of said other systems 13 of the flight management system 14. In the example shown, the waypoint P5 is deleted, the aircraft having to return to the waypoint P6 directly from the waypoint P4. The aircraft firstly follows a flight path over a straight-line-flight distance d0 while maintaining the course for arriving at the waypoint P4. It then makes a turn (quite a short turn in the example) to orient itself towards the waypoint P6, this turn causing said aircraft to leave the flight path of the initial flight plan T1.

Certain aircraft, in particular those used for low-altitude flight, have a straight-line-flight distance d0 between waypoints that is equal to 0.3 nautical miles (approximately 555 m), and lateral turning radii that are equal to 1.5 or 3 nautical miles (approximately 2778 m or 5556 m).

Upon arrival at the waypoint P6, the aircraft passes it at the same conventional straight-line distance d0. It then turns to orient its course towards the waypoint P7. After the waypoint P7, it follows the straight-line flight plan, and so on for the following waypoints P8. As noted, although the aircraft returns to the waypoints P6, P7 of the initial flight plan T1, the flight path T2 of the modified flight plan is not only different between the waypoints P4 and P6, but also between the waypoints P6 and P7, as well as between the subsequent waypoints P7 and P8.

To avoid these differences, in the event of a waypoint P5 being deleted from the initial flight plan T1, said modification means 11 are configured to define a new intermediate point P5' between said upstream (waypoint P4) and downstream (waypoint P6) waypoints of the deleted waypoint (waypoint P5) of which the coordinates are calculated to allow the aircraft to arrive at said downstream waypoint P6 in the modified flight plan T3 on the same course as that provided by the initial flight plan T1, as shown in FIG. 3.

The intermediate point P5' is positioned between the waypoints P4 and P6, such that, using the method for calculating the flight path used by the modification means 11, the aircraft arrives at the waypoint P6 with the same direction as that of the initial flight plan T1. Owing to this method, the aircraft has an identical flight path in the modified flight plan T3 as that of the initial flight plan T1 between the waypoints P6 and P7 as well as the following waypoints P7 and P8. The method for calculating the coordinates of the intermediate point P5', used by the modification means 11, is shown in FIG. 4.

This method consists in defining two circles C1, C2 of which the coordinates of the centres, Ω and Ω' respectively, are fixed such that the two circles C1, C2 describe a part of the route that the aircraft has to take. Said circles also make it possible to define the coordinates of the intermediate point P5'. The radii of the circles C1, C2 can have different values, but to simplify this example, said first and second radii R of said first C1 and second C2 circles, respectively, are equal and correspond to the radius of the turns made in the conventional method for calculating the flight path, which depends on the capacity of the aircraft.

The first, upstream circle C1 (in the direction of flight V of the aircraft) passes through a crossing point P of the aircraft, and is positioned such that the direction of the aircraft at said crossing point P is tangential to said first circle C1. In other words, the coordinates of the centre Ω of the first circle C1 are calculated such that the radius R starting from the centre Ω of the first circle C1 and going up to the crossing point P on one hand and the direction G of the aircraft at said crossing point P on the other hand form a right angle.

The crossing point P is located after the upstream waypoint P4 in order to modify the flight path between the upstream waypoint P4 and the downstream waypoint P6.

If the modification takes place before the aircraft flies over the upstream waypoint P4 or as the aircraft flies over said waypoint, the crossing point P is positioned at a distance from the upstream waypoint P4 corresponding to the predetermined straight-line-flight distance d0 between the waypoints.

If the modification takes place after the predetermined straight-line-flight distance d0, that is to say that the aircraft is turning or is already pointing in the direction of the waypoint P5 to be deleted, the crossing point P is the point at which the aircraft is located at the moment that the device 1 is requested, by the means 10, to carry out the modification.

The second downstream circle C2 passes through said downstream waypoint P6, and is positioned such that the flight path corresponding to the initial flight plan T1 of the aircraft at said downstream waypoint P6 is tangential to said second circle C2. In other words, the coordinates of the centre Ω' of the second circle C2 are calculated such that the radius R starting from the centre Ω' of the second circle C2 and going up to the downstream waypoint P6 on one hand and the direction of the aircraft at said downstream waypoint P6 in the initial flight plan T1 on the other hand form a right angle.

In order to find the coordinates of the intermediate point P5', the rest of the method consists in defining a straight line D tangential to said first and second circles C1 and C2, this straight line passing between the two circles C1, C2. Said tangential straight line D is tangential to the first circle C1 at a first point of intersection E and to the second circle C2 at a second point of intersection F.

The coordinates of the intermediate point P5' are selected such that it belongs to said tangential straight line D between said first E and second F points of intersection.

In order for it to be possible to use the conventional method for calculating the flight path, said intermediate point P5' is positioned at a distance from the second point of intersection F corresponding to the predetermined straight-line-flight distance d0 between the waypoints.

Thus, owing to the device 1, the crew themselves do not need to calculate the coordinates of an intermediate waypoint P5' which allows the aircraft to return to the initial flight plan and do not need to provide said waypoint to the flight management system 14. It is sufficient to delete a waypoint P5 from the initial flight plan T1 or to directly enter the coordinates of the downstream waypoint P6 that is to be reached, for example using the means 10. The device 1 thus automatically calculates the intermediate waypoint P5' which allows the aircraft to be taken in the same direction as that of the initial flight plan T1 to the downstream waypoint P6.

For this purpose, as shown in FIG. 1, the means 10 for triggering the modification to the flight plan give the modification means 11 the order to modify the route plan by calculating the intermediate point. The flight plan modified by these modification means 11 is transmitted by the transmission means 12 to the other systems 13 of the flight management system 14, or to external systems, such as a display device.

The part of the lateral flight path corresponding to the modified flight plan T3 of the aircraft up to the downstream waypoint P6 follows in this order, as shown in FIG. 4:
  a first arc of said first circle C1, this first arc being defined between the crossing point P and the first point of intersection E;
  the tangential straight line D between this first point of intersection E and the second point of intersection F, passing through said intermediate point P5'; and
  a second arc of said second circle C2, this second arc being defined between said second point of intersection F and said downstream waypoint P6.

By following this flight path, the aircraft flies over the downstream waypoint P6 on the same course as that of the initial flight plan T1. In the modified flight plan T3, the rest of the flight path after the downstream waypoint P6 is therefore identical to that of the initial flight plan T1.

The invention claimed is:

1. A method for automatically modifying a lateral flight plan of an aircraft, said flight plan being defined by a sequence of waypoints that the aircraft is to fly over and flight-path portions connecting the successive waypoints, wherein, for modifying a flight plan referred to as initial to become a modified flight plan, the method comprises:
  performing, by a modification device, an action to be selected from the following actions: adding, deleting or moving at least one waypoint of the initial flight plan, said modified flight plan comprising a downstream waypoint defined as the waypoint at which the aircraft returns to the initial flight plan, and an upstream waypoint preceding the downstream waypoint, and
  defining, by the modification device, an intermediate point between said upstream and downstream waypoints, of which the coordinates are calculated to allow the aircraft to arrive at said downstream waypoint on the same course as that provided by the initial flight plan,
  wherein for defining the intermediate point, said method comprises:
  defining, by the modification device, a first upstream circle having a first predetermined radius, passing through a crossing point of the aircraft located after the upstream waypoint and positioned such that the direction of the aircraft at said crossing point is tangential to said first circle;
  defining, by the modification device, a second downstream circle having a second predetermined radius, passing through said downstream waypoint and positioned such that the flight path corresponding to the initial flight plan of the aircraft at said downstream waypoint is tangential to said second circle;
  defining, by the modification device, a straight line tangential to said first and second circles, said tangential straight line being tangential to the first circle at a first point of intersection and to the second circle at a second point of intersection; and defining, by the modification device, said intermediate point on said tangential straight line between said first and second points of intersection.

2. The method according to claim 1, wherein said intermediate point is located at a distance from the second point of intersection corresponding to a predetermined straight-line-flight distance between the waypoints.

3. The method according to claim 1, wherein said first and second radii of said first and second circles, respectively, are equal.

4. The method according to claim 1, wherein said crossing point is positioned at a distance from the upstream waypoint corresponding to a predetermined straight-line-flight distance between the waypoints.

5. The method according to claim 1, wherein the part of the lateral flight path corresponding to the modified flight plan of the aircraft up to the downstream waypoint follows in this order:

a first arc of said first circle, the first arc being defined between the crossing point and the first point of intersection;

the tangential straight line between the first point of intersection and the second point of intersection, passing through said intermediate point; and a second arc of the second circle, the second arc being defined between said second point of intersection and said downstream waypoint.

6. The method according to claim 1, wherein the flight plan is modified for a low-altitude section of flight.

7. A device for modifying a lateral flight plan of an aircraft, the flight plan being defined by a sequence of waypoints that the aircraft is to fly over and flight-path portions connecting the waypoints, the device comprising:

modification means configured to modify the flight plan by an action to be selected from the following actions:

deleting, adding and moving at least one waypoint of the initial flight plan, said modified flight plan comprising a downstream waypoint defined as the waypoint at which the aircraft returns to the initial flight plan, and an upstream waypoint preceding the downstream waypoint, and by defining a new intermediate point between said upstream and downstream waypoints, of which the coordinates are calculated to allow the aircraft to arrive at said downstream waypoint on the same course as that of the initial flight plan, wherein the modification means comprise elements for respectively: defining a first upstream circle having a first predetermined radius, passing through a crossing point of the aircraft located after the upstream waypoint and positioned such that the direction of the aircraft at said crossing point is tangential to said first circle;

defining a second downstream circle having a second predetermined radius, passing through said downstream waypoint and positioned such that the flight path corresponding to the initial flight plan of the aircraft at said downstream waypoint is tangential to said second circle;

defining a straight line tangential to said first and second circles, said tangential straight line being tangential to the first circle at a first point of intersection and to the second circle at a second point of intersection; and defining said intermediate point on said tangential straight line, between said first and second points of intersection.

8. The device according to claim 7, further comprising:

means for triggering the modification of the flight plan; and means for transmitting the modified flight plan.

9. A flight management system comprising:

a device for modifying a lateral flight plan of an aircraft, the flight plan being defined by a sequence of waypoints that the aircraft is to fly over and flight-path portions connecting the waypoints, the device comprising:

modification means configured to modify the flight plan by an action to be selected from the following actions:

deleting, adding and moving at least one waypoint of the initial flight plan, said modified flight plan comprising a downstream waypoint defined as the waypoint at which the aircraft returns to the initial flight plan, and an upstream waypoint preceding the downstream waypoint, and by defining a new intermediate point between said upstream and downstream waypoints, of which the coordinates are calculated to allow the aircraft to arrive at said downstream waypoint on the same course as that of the initial flight plan, wherein the modification means comprise elements for respectively:

defining a first upstream circle having a first predetermined radius, passing through a crossing point of the aircraft located after the upstream waypoint and positioned such that the direction of the aircraft at said crossing point is tangential to said first circle;

defining a second downstream circle having a second predetermined radius, passing through said downstream waypoint and positioned such that the flight path corresponding to the initial flight plan of the aircraft at said downstream waypoint is tangential to said second circle;

defining a straight line tangential to said first and second circles, said tangential straight line being tangential to the first circle at a first point of intersection and to the second circle at a second point of intersection; and defining said intermediate point on said tangential straight line, between said first and second points of intersection.

* * * * *